(12) United States Patent
Kertscher

(10) Patent No.: US 7,695,587 B2
(45) Date of Patent: Apr. 13, 2010

(54) INSTALLATION AND METHOD FOR MANUFACTURING DRIP IRRIGATION PIPES

(75) Inventor: Eberhard Kertscher, Yvonand (CH)

(73) Assignee: The Thomas Machines S.A., Couvet (CH)

( * ) Notice: Subject to any disclaimer, the term of this patent is extended or adjusted under 35 U.S.C. 154(b) by 412 days.

(21) Appl. No.: 11/673,856

(22) Filed: Feb. 12, 2007

(65) Prior Publication Data

US 2007/0187031 A1    Aug. 16, 2007

(30) Foreign Application Priority Data

Feb. 10, 2006    (EP)    ................ 06101518

(51) Int. Cl.
| B29C 49/00 | (2006.01) |
| B29C 47/00 | (2006.01) |
| B29C 65/00 | (2006.01) |
| B31F 1/00 | (2006.01) |
| B32B 37/00 | (2006.01) |
| C08J 5/00 | (2006.01) |
| B05B 15/00 | (2006.01) |
| B05B 1/30 | (2006.01) |

(52) U.S. Cl. ............. 156/293; 156/198; 156/199; 156/244.13; 156/244.22; 156/308.2; 239/542; 239/547; 239/569; 239/574; 425/114

(58) Field of Classification Search ........... 156/196, 156/198, 199, 212, 242, 244.11, 244.12, 156/244.13, 244.15, 244.22, 244.25, 244.27, 156/293, 294, 297, 298, 302, 303.1, 308.2, 156/308.4, 309.6, 309.9, 423, 500, 538, 539, 156/543, 552; 239/542, 547, 566, 568, 266, 239/267, 268, 269; 264/171.11, 171.12, 264/171.13, 209.3, 176.1, 177.1, 177.17, 264/209.1; 425/114, 505, 516
See application file for complete search history.

(56) References Cited

U.S. PATENT DOCUMENTS

| 5,271,786 | A  | * | 12/1993 | Gorney et al. ............... 156/229 |
| 6,461,468 | B1 | * | 10/2002 | Cohen .................... 156/244.13 |
| 6,896,758 | B1 | * | 5/2005  | Giuffre' ................. 156/244.13 |
| 2003/0150940 | A1 | * | 8/2003 | Vildibill et al. ............. 239/542 |
| 2005/0258278 | A1 | * | 11/2005 | Cohen ........................ 239/542 |

FOREIGN PATENT DOCUMENTS

| EP | 0 970 602    | 1/2000  |
| EP | 1 208 741 A1 | 5/2002  |
| WO | 99/55141     | 11/1999 |

* cited by examiner

OTHER PUBLICATIONS

European Search Report issued in corresponding application No. EP 06 10 1518, completed Nov. 13, 2006.

*Primary Examiner*—Richard Crispino
*Assistant Examiner*—Brian R Slawski
(74) *Attorney, Agent, or Firm*—Griffin & Szipl, P.C.

(57) ABSTRACT

The invention concerns an installation for manufacturing a drip irrigation pipe (8) formed of a pipe (8) provided with drippers (4), including a dripper feed station (37), followed by an extrusion station (10), including an extrusion head (14) producing a tubular blank (22) and means for welding the drippers (4) to the inner wall of said blank (22), characterized in that the dripper welding means (4) include a support surface (50) and a counter-support surface (56) between which the drippers (4) are pressed against said tubular blank (22) so as to be welded thereto, said support (50) and counter-support (56) surfaces being arranged upstream of the calibrating means (24).

4 Claims, 3 Drawing Sheets

INSTALLATION AND METHOD FOR MANUFACTURING DRIP IRRIGATION PIPES

This application claims priority from European Patent Application No. 06101518.6, filed Feb. 10, 2006, the entire disclosure of which is incorporated herein by reference.

FIELD OF THE INVENTION

The present invention concerns a drip irrigation pipe manufacturing line. More specifically, the invention concerns an installation of this type provided with a dripper feed device allowing improved welding of the drippers to the pipe.

BACKGROUND OF THE INVENTION

It is common practice to use, for certain irrigations, so-called "drip" pipes. These are pipes whose wall is pierced, at intervals fixed beforehand, with holes of small diameter through which the water flows into the ground. In order to control the flow from the holes with precision, a flow limiter, commonly called a "dripper" and formed of a hollow plastic part bonded to the inner wall of the pipe, is provided facing each hole. This part has, on the side turned towards the inner wall of the pipe, a hollow part that forms a collecting chamber. This collecting chamber is connected to the inner space of the pipe by a conduit forming a labyrinth formed by a pre-prepared groove on the cylindrical face of the drip, which is intended to be turned towards the inner face of the pipe.

In drip irrigation pipe manufacturing installations like, for example, that disclosed in EP Patent Application No. 0 970 602, drippers are fed regularly into an extrusion station comprising extrusion, calibrating and welding means from a feed device such as a centrifugal bowl and orientator for feeding the drippers according to a determined orientation. In the extrusion station feed by plastic material melted in a melting chamber, the pipe is continuously formed by an extrusion head, calibrated, and the drippers are welded at regular intervals to the inner wall of the still warm pipe so that they adhere to the latter by melting locally. Once the pipe-dripper assembly has cooled in a water cooling tank, a hole is pierced in the wall of the pipe, facing the collecting chamber.

According to this document, the drippers are brought into contact with the pipe and welded thereto using a guide support which penetrates and passes through the extrusion station to extend into the cooling tank, in which a device is provided for pinching the dripper-pipe assembly between the guide support and a belt moving substantially at the speed of progression of the pipe. Welding thus occurs downstream of the melting chamber and the calibrator in the cooling tank. At this point, the pipe has already cooled down greatly, such that the weld between the dripper and the pipe can exhibit imperfections. In order to overcome this problem it is common to overheat the plastic material so that its temperature is still sufficiently high at the point when the drippers are welded. The material is thus brought to a temperature close to its molecular degradation limit. Slight temperature variations can then cause deterioration in the quality of the material, which involves very strict control of the heating temperature, and consequently, an increase in the production costs. Another solution that avoids overheating the plastic material consists in heating the drippers themselves prior to putting them into contact with the pipe. In order to do this, the guide support is provided with a heating resistor. This solution, however, involves significant extra space, complication and increased cost.

SUMMARY OF THE INVENTION

It is thus an object of the present invention to improve the welding of the dripper to the pipe by realising the weld in immediate proximity to the extrusion head or directly inside the latter, i.e. in greater proximity to the melting chamber. This solution is free of the aforementioned drawbacks.

More specifically, the invention concerns an installation for manufacturing a drip irrigation pipe formed of a pipe provided with drippers, comprising a dripper feed device followed by an extrusion station comprising an extrusion head producing a tubular blank, means for calibrating said tubular blank and means for welding the drippers to the inner wall of said blank. According to a first aspect of the invention, the dripper welding means include a support surface and a counter-support surface between which the drippers are pressed against the tubular blank so as to be welded thereto, the support and counter-support surfaces being arranged upstream of the calibrating means.

Owing to these features, it is possible to weld the drippers more reliably without having to heat the plastic material excessively, while simplifying the installation.

According to a particularly advantageous embodiment of the invention, the extrusion head includes a die formed of an inner mandrel and an outer mandrel arranged together so as to define an extrusion channel in which the tubular blank is formed, the inner mandrel and the outer mandrel respectively comprising an outer cylindrical portion and an inner cylindrical portion engaged respectively in one and the other so as to define at least partly, the extrusion channel, the outer cylindrical portion of the inner mandrel being shorter than the inner cylindrical portion of the outer mandrel, such that the end of the inner cylindrical portion forms the support surface.

According to another aspect, the invention concerns an installation for manufacturing a drip irrigation pipe formed of a pipe provided with drippers, comprising a dripper feed station followed by an extrusion station comprising an extrusion head producing a tubular blank, means for calibrating said tubular blank and means for welding the drippers to the inner wall of said blank, characterized in that the dripper welding means comprise a support surface located facing said tubular blank at a distance selected such that the drippers are pressed between said support surface and said tubular blank to be welded thereto, said support surface being arranged upstream of the calibrating means.

The invention also concerns a method of manufacturing a drip irrigation pipe formed of a pipe provided with drippers, comprising the following main steps:

providing a dripper feed station, and an extrusion station including an extrusion head, calibrating means and means for welding the drippers to the inner wall of said pipe, continuously forming a tubular blank using the extrusion head, calibrating the tubular blank using calibrating means, bringing the drippers inside the tubular blank using the dripper feed station, and welding the drippers upstream of the calibrating means using the welding means.

BRIEF DESCRIPTION OF THE DRAWINGS

The invention will be better understood in light of the following detailed description of an example embodiment of the installation according to the invention, this example being given purely by way of illustrating and non-limiting example, with reference to the annexed drawing, in which.

DETAILED DESCRIPTION OF THE ILLUSTRATIVE EMBODIMENTS

Figure 1:
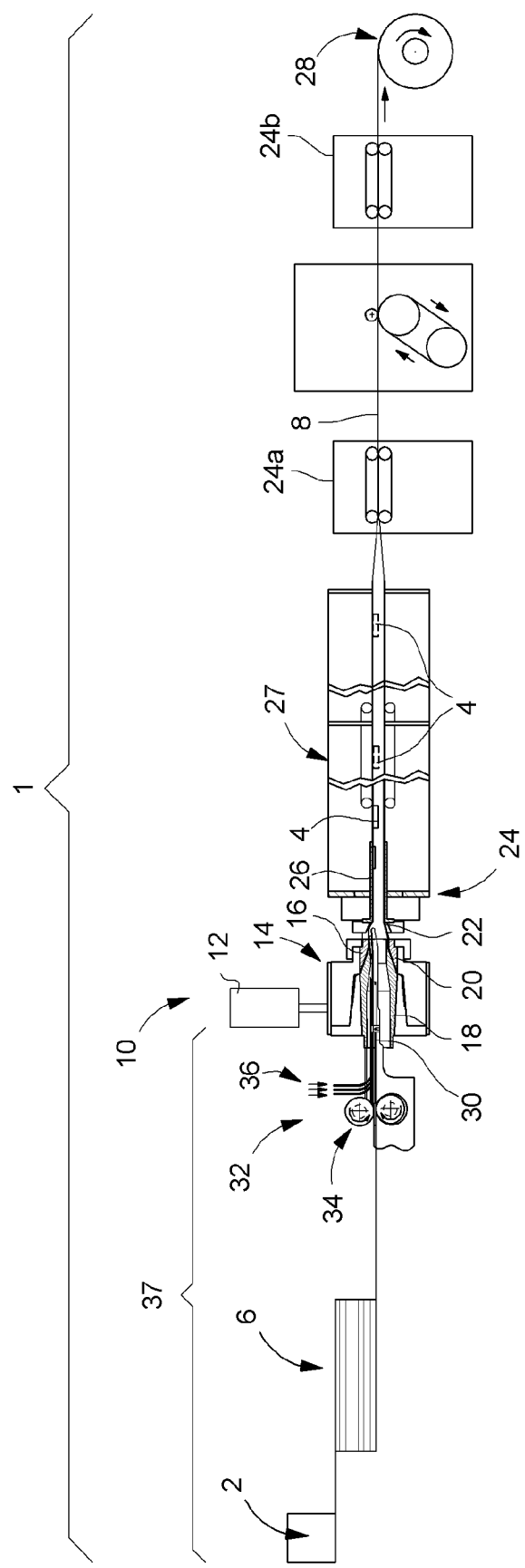
FIG. 1 is a schematic diagram of a drip type irrigation pipe manufacturing installation according to the invention.

The drip type irrigation pipe manufacturing line shown in FIG. 1 and designated as a whole by the general reference numeral 1, includes in a conventional manner a magazine 2 such as a centrifugal bowl which sorts, orientates and positions drippers 4 in an accumulator device 6 according to the position that they will have to take up once they are introduced into irrigation pipe 8. After accumulator device 6 there is an extrusion station 10. This extrusion station 10 includes a melting chamber 12 for the plastic material that feeds an extrusion head 14 provided with a die 16 formed of a conical inner mandrel 18 and an outer mandrel 20 arranged such that a tubular blank 22 comes out of die 16. Blank 22 is drawn by traction stations 24a and 24b passing through calibrating means 26 and a cooling tank 27. Beyond traction station 24b, pipe 8 is wound onto a spool 28.

In order to fix drippers 4, inner mandrel 18 has an axial passage inside which there is arranged a guide support 30 for bringing the drippers into contact with pipe blank 8. Guide support 30 receives the drippers 4 from magazine 2 via accumulator device 6. A driving device 32, provided, in the example shown, with drive rollers 34 assisted by air jets 36 moves drippers 4 forwards inside extrusion station 10. Guide support 30 forms, with driving device 32, magazine 2 and accumulator device 6, a dripper feed station 37.

This general arrangement is conventional within drip irrigation pipe manufacturing technology.

Figure 2:
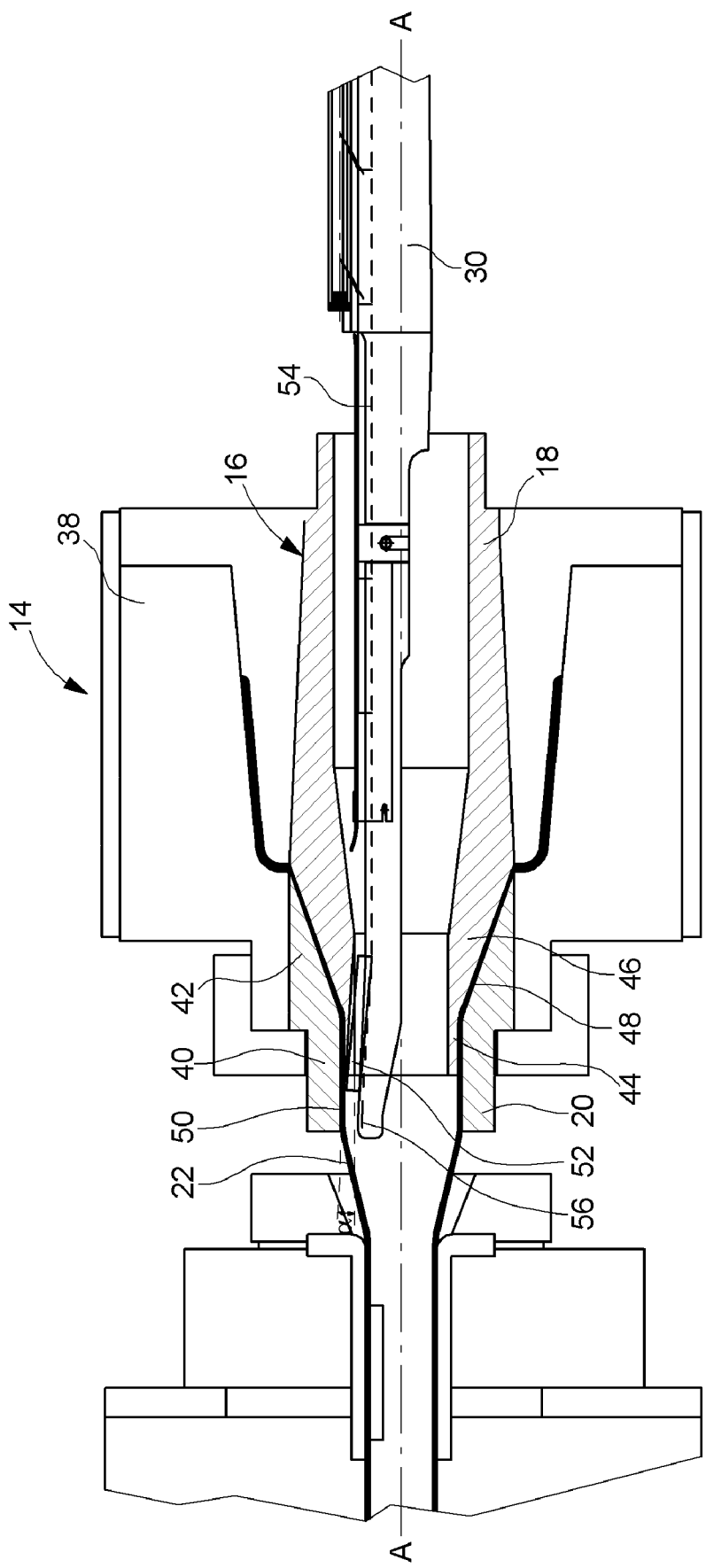
FIG. 2 is an axial cross-section of the extrusion head according to the invention.
Figure 3:
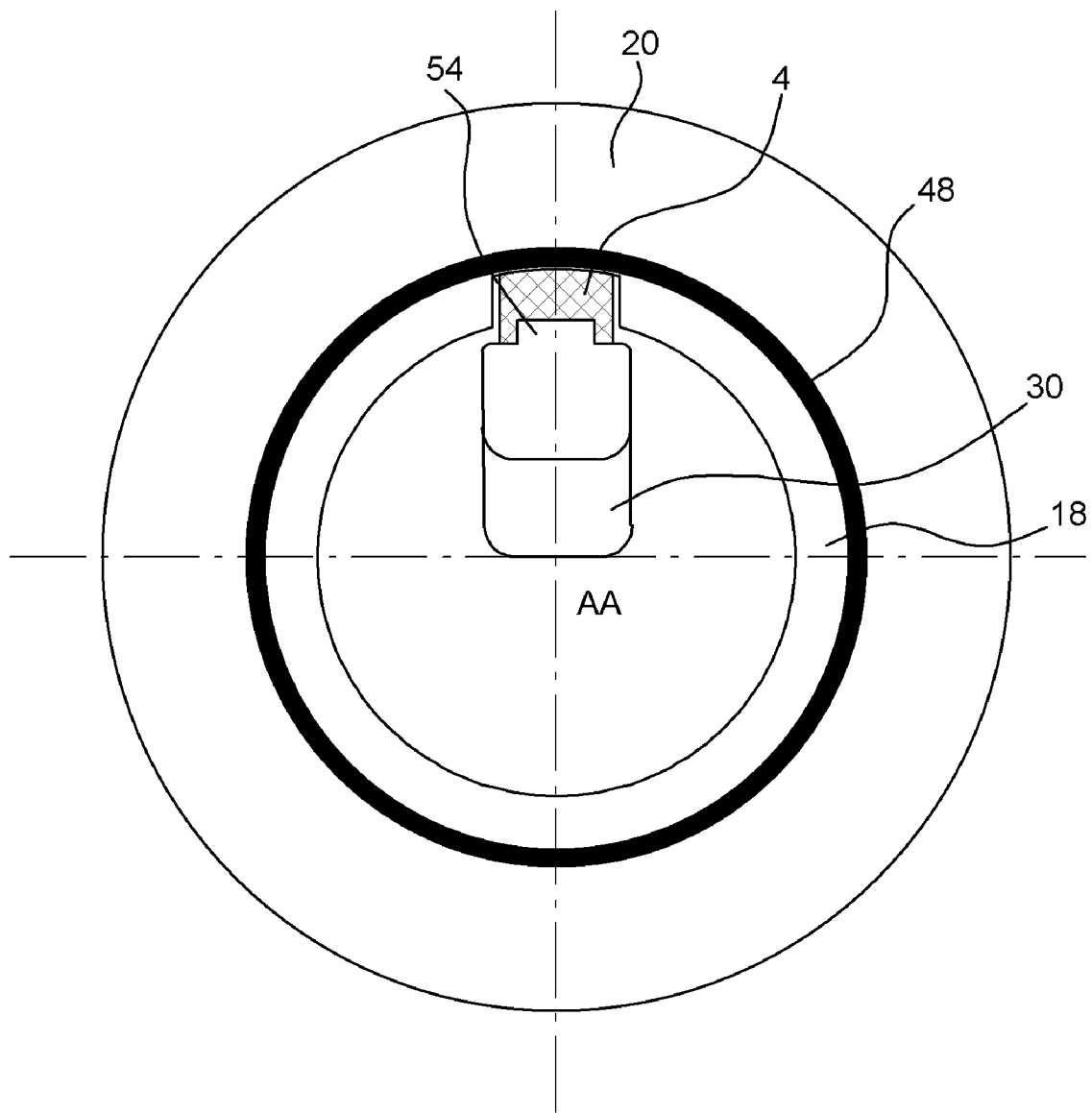
FIG. 3 is a partial enlarged view of a transverse cross-section of said extrusion head.

Extrusion head 14 shown in FIGS. 2 and 3, comprises in a conventional manner a die 16 rigidly mounted inside a frame 38. Die 16 is formed of an outer mandrel 20 with an axis of symmetry AA and an inner mandrel 18 engaged in outer mandrel 20 and coaxial thereto. Outer mandrel 20 substantially forms a hollow tube including a cylindrical portion 40 and a conical portion 42 extending cylindrical portion 40. Inner mandrel 18 also substantially forms a hollow tube including a cylindrical portion 44 that flares into a conical portion 46. The cylindrical portions 40 and 44 respectively, and conical portions 42 and 46 respectively of outer mandrel 20 and inner mandrel 18 are arranged respectively facing each other, so as to define an extrusion channel 48 for shaping the plastic material. According to the invention, the cylindrical portion 44 of inner mandrel 18 is shorter than the cylindrical portion 40 of outer mandrel 20, such that the end of the latter projects in relation to extrusion channel 48 when inner mandrel 18 is engaged in outer mandrel 20. The inner surface of this projecting portion forms a support surface 50, located directly at the output of extrusion channel 48. Its function will be explained subsequently. Moreover, inner mandrel 18 includes a groove 52 made in its cylindrical portion 44. The bottom of groove 52 forms the smallest possible angle α with support surface 50, which is itself parallel to axis AA. Typically, angle α takes values comprised between 2° and 15°, preferably 5°. At the inner end of cylindrical portion 44, the bottom of groove 52 is flush with the inner surface of cylindrical portion 44. At the outer end of cylindrical portion 44, the thickness of the wall of inner mandrel 18 is as small as possible, such that the bottom of groove 52 is practically flush with the outer surface of cylindrical portion 44. By way of example, the thickness of the wall of inner mandrel 18 in proximity to tubular blank 22 is comprised between 0.1 mm and 1 mm. The function of groove 52 will be explained hereinafter.

Guide support 30 is formed of a rod whose top surface forms a guide rail 54 for drippers 4. It is engaged in inner mandrel 18, guide rail 54 being located facing groove 52. The end thereof substantially coincides with the end of outer mandrel 20. The top surface of guide support 30 is first of all parallel to axis AA, then, at the height of cylindrical portion 44, it inclines by an angle α, parallel to the bottom of groove 52. Finally, the final portion of guide support 30 located opposite support surface 50 is parallel to axis AA, and forms a counter-support surface 56, as described in the following description.

When a dripper 4 is conveyed by guide support 30, owing to driving device 32, it is first of all guided in its movement by rail 54, parallel to axis AA. It then penetrates groove 52 and continues its movement at an inclination of an angle α relative to axis AA, simultaneously guided by rail 54 and groove 52. Upon exiting groove 52, it comes into contact with tubular blank 22, which has itself just left extrusion channel 48. It is practically tangential to tubular blank 22 at the point of contact, owing to the fact that angle α and the thickness of the wall of inner mandrel 18 in proximity to tubular blank 22 are both small. This geometry allows dripper 4 to enter into contact with tubular blank 22 when it is still very hot and viscous at the exit of extrusion channel 48, without damaging it, and in particular piercing it. Dripper 4 then continues its movement, welded to tubular blank 22 via the end thereof, and still guided by rail 54. It finally reaches the final portion of guide support 30, parallel to axis AA and to support surface 50. The distance between the support surface 50 and the counter-support surface 56 is selected such that, in this zone, dripper 4 is pressed against tubular blank 22, between the two surfaces 50 and 56. It is thus welded to tubular blank 22 over its entire length. Since the weld is carried out in extrusion head 14, directly at the exit of extrusion channel 48, it occurs as close as possible to the melting chamber, at a sufficiently high temperature to ensure the weld quality.

In the embodiment presented hereinbefore, support surface 50 is formed by the extension of outer mandrel 20 beyond extrusion channel 48. This arrangement is particularly simple to achieve and does not require any additional parts relative to outer mandrel 20 and to inner mandrel 18. In a first variant of this embodiment, outer mandrel 20 only extends beyond extrusion channel 48 in the zone located directly opposite guide support 30, to form support surface 50. In fact, as only this surface 50 is operational, the rest of cylindrical portion 40 extending extrusion channel 48 can be omitted. In a second variant of this embodiment, support surface 50 is formed by an added cylindrical part or a part forming a portion of cylinder, fixed, for example, to cylinder portion 40.

The embodiment described above is compatible with any thickness of irrigation pipe and in particular with pipes of small thickness, for example of the order of 0.1 mm. Another embodiment (not shown) preferably lends itself to the manufacture of thicker pipes. This embodiment differs from the preceding embodiment only in that support surface 50 is absent. In fact, owing to its tension at the exit of the extrusion channel, tubular blank 22 has sufficient resistance to oppose the pressure of dripper 4 without being damaged, for pipes with walls whose thickness is greater than 0.4 mm. In this embodiment, the cylindrical portion 44 of inner mandrel 18 is the same length as cylindrical portion 40 of outer mandrel 20.

Their ends are thus aligned when inner mandrel 18 is engaged in outer mandrel 20. The end of guide support 30 projects relative to extrusion head 14, such that the counter-support surface 56 is located opposite tubular blank 22 at the exit of extrusion channel 48. Surface 56 is arranged such that dripper 4 is pressed between the latter and tubular blank 22, in order to be welded thereto. In this case, this is termed a support surface 56 and not a counter-support surface.

It goes without saying that the present invention is not limited to the embodiment that has just been described and that various simple modifications and variants can be envisaged by those skilled in the art, without departing from the scope of the invention as defined by the annexed claims.

It will be noted for example that, according to a variant of the embodiments described, groove 52 can be omitted, dripper 4 being guided to tubular blank 22 by guide rail 54 alone. In such case, the cylindrical portion 44 will advantageously have a conical portion defined by its angle α with axis AA, angle α being sufficiently small that the dripper arrives practically tangential to tubular blank 22.

One could also replace groove 52 with a hollow that has no guiding properties, but that orientates dripper 4 relative to tubular blank 22.

It should be noted finally that, according to another variant of the manufacturing line according to the invention, drippers 4 are not made and welded in unitary form, but are connected to each other by their body which is made in a single piece having the shape of a continuous band. The band includes on its outer surface and at regular intervals, a plurality of collecting chambers respectively connected to a labyrinth that is cut or printed into said external surface and communicates with the inner surface of the band. The band can be wound onto a spool, and conveyed to the point of welding to tubular blank 22 by a suitable guide support.

What is claimed is:

1. A method of manufacturing a drip irrigation pipe formed of a pipe provided with drippers, comprising the following main steps:
    providing a dripper feed station, and an extrusion station including an extrusion head, calibrating means and means for welding the drippers to the inner wall of said pipe,
    continuously forming a tubular blank using said extrusion head,
    calibrating said tubular blank using calibrating means,
    conveying said drippers inside the tubular blank using the dripper feed station, and
    welding said drippers to said tubular blank formed upstream of said calibrating means using said welding means, wherein said drippers are welded inside said extrusion head.

2. The method according to claim 1, wherein the extrusion head includes an extrusion channel generating said tubular blank wherein said extrusion head further includes a support surface arranged in proximity to the exit of said extrusion channel, wherein said dripper feed means include a counter-support surface arranged opposite said support surface, and wherein said drippers are pressed between said support surface and said counter-support surface against said tubular blank in order to be welded thereto.

3. The method according to claim 1, wherein the extrusion head includes an extrusion channel and an inner mandrel forming a cylindrical portion whose wall is thinned in proximity to the exit of the extrusion channel, wherein the welding is carried out at the exit of the extrusion channel.

4. The method according to claim 1, wherein said drippers are connected to each other via the body thereof made in a single piece having the shape of a continuous band.

* * * * *